United States Patent
Sundaresan

(10) Patent No.: US 7,653,654 B1
(45) Date of Patent: Jan. 26, 2010

(54) METHOD AND SYSTEM FOR SELECTIVELY ACCESSING FILES ACCESSIBLE THROUGH A NETWORK

(75) Inventor: Neelakantan Sundaresan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 2205 days.

(21) Appl. No.: 09/672,304

(22) Filed: Sep. 29, 2000

(51) Int. Cl.
*G06F 17/30* (2006.01)

(52) U.S. Cl. ............. 707/104.1; 707/10; 707/101; 709/203; 709/219

(58) Field of Classification Search .......... 707/1, 707/3, 10, 513
See application file for complete search history.

(56) References Cited

U.S. PATENT DOCUMENTS

| | | | |
|---|---|---|---|
| 5,748,954 A | 5/1998 | Mauldin | |
| 5,761,418 A | 6/1998 | Francis et al. | |
| 6,078,924 A * | 6/2000 | Ainsbury et al. | 707/101 |
| 6,094,681 A * | 7/2000 | Shaffer et al. | 709/224 |
| 6,119,101 A * | 9/2000 | Peckover | 705/10 |
| 6,167,436 A * | 12/2000 | Yamane et al. | 709/213 |
| 6,236,661 B1 * | 5/2001 | Ballard | 370/410 |
| 6,262,987 B1 * | 7/2001 | Mogul | 370/400 |
| 6,321,265 B1 * | 11/2001 | Najork et al. | 709/224 |
| 6,424,966 B1 * | 7/2002 | Meyerzon et al. | 707/10 |
| 2003/0135464 A1 * | 7/2003 | Mourad et al. | 705/50 |
| 2003/0212992 A1 * | 11/2003 | Ronning et al. | 717/178 |

OTHER PUBLICATIONS

Microsoft Computer Dictionary, Fifth Edition, p. 211.*

* cited by examiner

*Primary Examiner*—Leslie Wong
(74) *Attorney, Agent, or Firm*—McGinn IP Law Group, PLLC

(57) ABSTRACT

A method (and system) for periodically searching through files accessible through a network, at an interval based on previously accessed data. The method includes accessing and download data from a first file on the network. An accessing time is set to access a second file on the network based on the data downloaded from the first file. In one further embodiment, the first file is a Channel Definition Format (CDF) file.

23 Claims, 1 Drawing Sheet

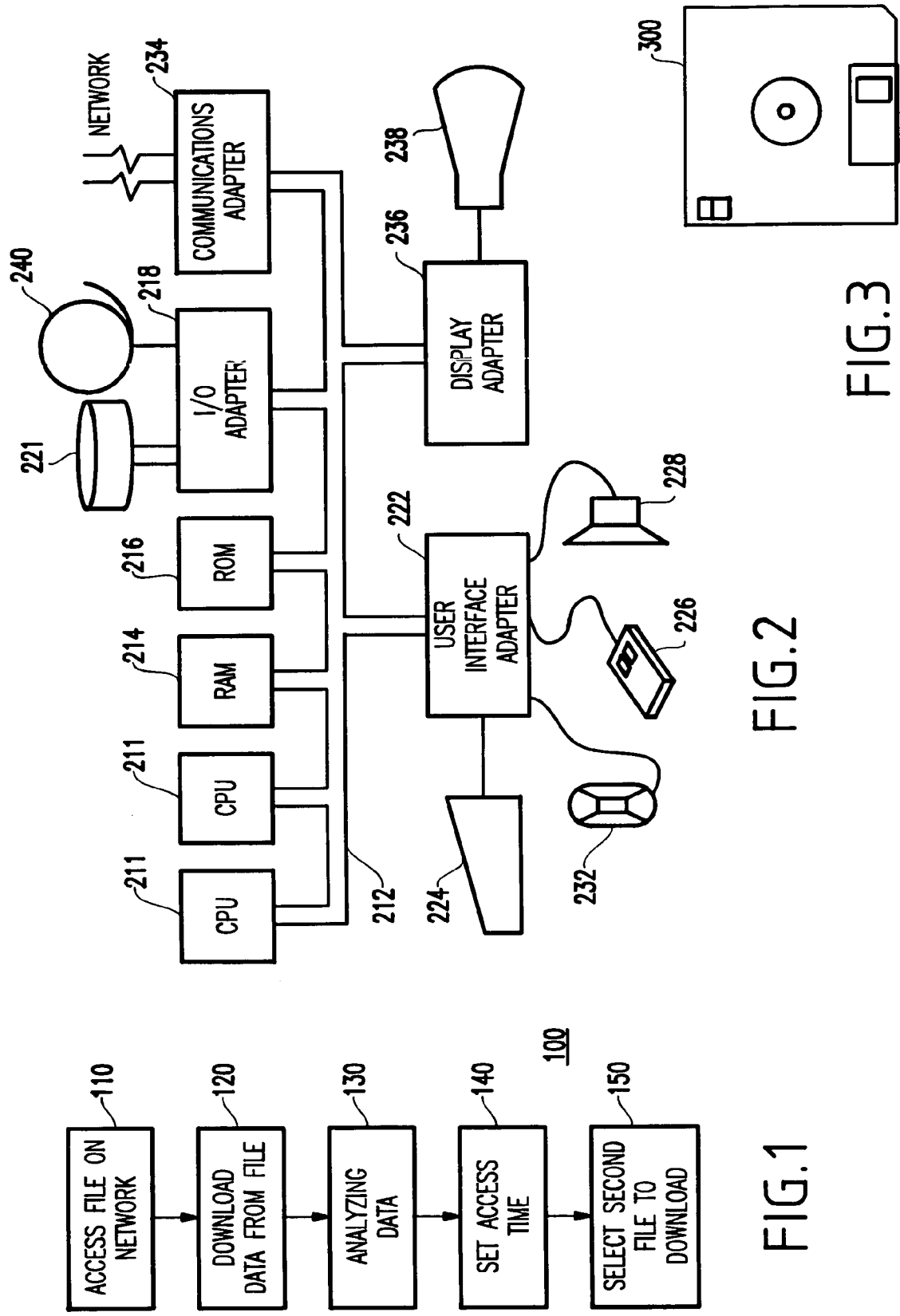

METHOD AND SYSTEM FOR SELECTIVELY ACCESSING FILES ACCESSIBLE THROUGH A NETWORK

BACKGROUND OF THE INVENTION

1. Field of the Invention

The present invention generally relates to a method and system for periodically searching through files accessible through a network, and in particular, to a method and system for searching through files accessible on a network during scheduled period searches of files based on data from files previously accessed.

2. Description of the Related Art

A network server maintains various files accessible across a network. In the case of the Internet, the files may comprises hypertext mark-up language (HTML) data, Common Gateway Interface (CGI) script, image files (e.g., .jpg and .gif), and Channel Definition Format (CDF) files. Collectively, the files linked through HTML files produce a website, wherein the server acts as the website host.

CDFs are small files which include data used by websites' "push" to specify how often and what parts of the site will be "pushed" (e.g., e-mailed) directly to a registered subscriber. Based on the data in the CDF, the website will e-mail various information to the subscriber.

A typical CDF file is an Extended mark-up language (XML) file. A CDF file contains various elements referred to as tags. Some tags include CHANNEL, ITEM, USER-SCHEDULE, SCHEDULE, LASTMOD, and LEVEL.

The CHANNEL tag has an HREF attribute that specifies the Universal Resource Locator (URL) on the website that corresponds to that CHANNEL. For example:

<CHANNEL HREF="http://www.mysite.com/Channel/homepage.htm">

The SCHEDULE tag indicates when a channel should be updated. For example:

<SCHEDULE STARTDATE="1999-09-23" STOPDATE="1997-11-23">
   <INTERVALTIME DAY="1"/>
   <EARLISTTIME HOUR="2"/>
   <LATESTTIME="6"/>
   </SCHEDULE> indicates that the channel should be updated every day between the start date and the stop date between 2 and 6.

Occasionally, a channel may have a subchannel. A subchannel refers to sub-sites on the website. A subchannel may appear as:

<ITEM HREF="foobar.htm" LASTMOD="1999-01-01 TO0101" LEVEL="2">
   <USAGE VALUE="ScreenSaver"></USAGE>
   </ITEM>

A subchannel references a URL with information about when the page was last modified, and from this URL whether the information is relevant.

A conventional search engine accesses websites on the network. The search engine downloads data from the website and archives selected downloaded data. The archived data is linked to the website from which it was downloaded.

One can use the search engine to search for a particular website containing desirable information by entering a query into the search engine. The search engine will search its archived data and return websites in its archived database which relate to the query.

The dynamic nature of the Internet results in websites being updated regularly. Consequently, data which was on the website when the search engine initially visited the website may no longer be there. Alternatively, the data may be outdated. Further, the website may no longer exist or its URL may have changed. As a result, data archived by the search engine could become invalid. In order for the search engine to be a useful tool, the search engine must periodically update its archived data.

A conventional search engine uses a web crawler (e.g., a "robot", "spider", "ant", etc.) to visit (i.e., access) a server on a network. The spider "crawls" from a homepage (i.e., the first or main webpage) of a website to the various subpages linked from the homepage. As the web crawler visits the various homepages with subpages, data on the pages are selectively archived by the search engine.

The typical crawlers visit web sites at regular intervals, for example, every 30 days. If a web crawler accesses a website which has not been updated since the last time the web crawler visited, the web crawler would presume that the data previously archived is still valid. This may be erroneous.

That is, one disadvantage with current web crawler technology is that the web crawler does not know when a website is scheduled to be updated. Depending on how often a website is updated, the web crawler's archived data could be very outdated by the time the web crawler returns. On the other hand, frequent web crawler visits to websites not frequently updated consumes valuable computer resources.

SUMMARY OF THE INVENTION

In view of the foregoing and other problems, an object of the present invention is to provide a method (and system) for determining when and how often a web crawler should return to a website.

Another object is to provide a method (and system) for using the push channel definition available (e.g., a CDF) or other data on the website to determine how often to visit the website and what parts of the website to crawl based upon the information such as SCHEDULE and ITEM, available from the website. For example, this method can take advantage of a website's "last updated," SCHEDULE, and ITEM information meant for "push" technology to automatically optimize when and how a web crawler crawls a website.

The invention, in a first aspect thereof, is a method (and system) for searching files stored on a network. A first file is accessed on the network and data is downloaded from the first file. The accessing time to access a second file is set based on the data downloaded from the first file. In a further embodiment, the data from the first file is analyzed to determine when a second file is to be scheduled to be updated and the accessing time is assigned based on when the second file is scheduled to be updated. In an alternate, further embodiment, the method includes selecting a second file to download based on data downloaded from the first file.

The invention, in a second aspect thereof, is a method (and system) for searching through files on an network. The method includes accessing a server on a network and downloading data from a first file. An accessing time to re-access the server is set based on data downloaded from the first file. In a further embodiment, the method includes accessing the server using the accessing time and downloading a second file from the server. In an alternate, further embodiment, the method includes selecting a second file to download based on data downloaded from the first file.

The invention, in a third aspect thereof, is a system comprising a machine readable recording medium storing a program for searching through files accessible on a network. The program includes executable instructions for accessing a first file on the network and downloading data from the first file. An accessing time to access a second file is set based on the data downloaded from the first file. In a further embodiment, the program includes accessing the server using the accessing time and downloading a second file from the server. In an alternate, further embodiment, the program includes selecting a second file to download based on data downloaded from the first file.

With the present invention, a website can be "crawled" by using data previously collected from that website. For example, by using data in a CDF, the web crawler can be directed to crawl certain areas of the website at various intervals corresponding to when the website is scheduled to e-mail (i.e., "push") information to its subscribers. As a result, using the present invention, it is likely that a web crawler will encounter updated information on the website. Consequently, the present invention provides for a more efficient web crawling of a website by crawling the site when and where it is likely the information contained therein is updated.

BRIEF DESCRIPTION OF THE DRAWINGS

The foregoing, and other objects, aspects, and advantages will be better understood from the following detailed description of a preferred embodiment of the invention with reference to the drawings, in which:

FIG. 1 is a flow diagram illustrating a preferred method 100 of the invention;

FIG. 2 is a schematic diagram of a system 200 for implementing a method of the present system; and FIG. 3 is a diagram of a readable recording medium for storing executable instructions.

DETAILED DESCRIPTION OF PREFERRED EMBODIMENTS OF THE INVENTION

Referring to FIG. 1, method 100 is directed to searching through files stored on a network. Method 100 includes accessing a first file on a network (Step 110).

Data is downloaded from the first file (Step 120). This data is then analyzed (Step 130). If the first file is a CDF, analysis includes identifying various elements such as CHANNEL, SCHEDULE, and ITEM (Step 130). Next, values corresponding to the aforementioned elements are extracted from the downloaded data (Step 130).

An access time to access a second file is set using the SCHEDULE value (Step 140). As such, the access time will be set to correspond to when the web site is scheduled to be "pushed." A second file is selected to be downloaded based on the ITEM value (Step 150). In one embodiment, the second file selected is the same as the first file (Step 150).

Method 100 can be implemented by a web crawler. An example of such an implementation may occur as follows. A web crawler is programmed to visit various websites which may contain CDFs. The web crawler is adapted to use the CDF information as a site map to determine which sub-websites to visit.

The first time the web crawler visits the website, the web crawler downloads the CDF file and keeps the site in a database, storing the CHANNEL and SCHEDULE information. Next, the web crawler uses the SCHEDULE information in the CHANNEL tag to decide when to visit the website next.

In one embodiment, the next visit is normalized by the web crawler's own parameters as to when to crawl a site. For instance, if a web crawler has its own schedule and decides to crawl less frequently than the SCHEDULE value, it uses its own schedule than the web site's SCHEDULE value.

When a web crawler visits a website on the web crawler's schedule, the web crawler may selectively visit sub-sites (e.g. items or subchannels) by using the LASTMOD and ITEM tags information in the CDF file to selectively crawl only those subchannels that have been or scheduled to be updated. It also uses the LEVEL attribute in any subchannel to see how deep to crawl.

An advantage of the present method is that using the SCHEDULE and ITEMS values provides for access only when a website and the website's associated files are scheduled to be updated. Consequently, a web crawler, utilizing this method, will access a website when the website is likely to have been updated, based on the CDF data.

Further, the method does not require any work by the website builder (e.g., web master) to accommodate the web crawler. The web crawler automatically uses the "push" information already available.

Referring now to FIG. 2, system 200 illustrates a typical hardware configuration of a processing method 100. Preferably, system 200 has at least one processor or central processing unit (CPU) 211. The CPUs 211 are interconnected via a system bus 212 to a random access memory (RAM) 214, read-only memory (ROM) 216, input/output (I/O) adapter 218 (for connecting peripheral devices such as disk units 221 and tape drives 240 to the bus 212), user interface adapter 222 (for connecting a keyboard 224, mouse 226, speaker 228, microphone 232, and/or other user interface device to the bus 212), a communication adapter 234 for connecting an information handling system to a data processing network, the Internet, an Intranet, a personal area network (PAN), or other similar information systems, and a display adapter 236 for connecting the bus 212 to a display device 238. Further, an automated reader/scanner 240 may be included. Such readers/scanners are commercially available from many sources.

In addition to the hardware/software environment described above, a different aspect of the invention includes a computer-implemented method for performing the above method. As an example, this method may be implemented in the particular environment discussed above.

Such a method may be implemented, for example, by operating the CPU 211 (FIG. 2), to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 211 and hardware above, to perform the method of the invention.

This signal-bearing media may include, for example, a RAM contained within the CPU 211, as represented by the fast-access storage for example. Alternatively, the instructions may be contained in another signal-bearing media, such as a magnetic data storage diskette 300 (FIG. 3), directly or indirectly accessible by the CPU 211.

Whether contained in the diskette 300, the computer/CPU 211, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

There are several advantages to the present invention. A major advantage is the invention's ability to "screen" websites. As the number of pages on the web grows (conceivably to well beyond 1 billion), it is impossible for search engines to keep up to date with all of these pages. The present invention provides a method and system which allows search engines to visit the pages that are the most recently updated, and to not visit those web pages that have not been updated.

Another advantage of the present invention is that it is not limited to CDF files only. It can work with any sitemap structure that a website provides with "change dates." For instance, Netscape uses a different format based on Resource Description Framework (RDF).

While the invention has been described in terms of preferred embodiments, those skilled in the art will recognize that the invention can be practiced with modification within the spirit and scope of the appended claims.

What is claimed is:

1. A method for searching files stored on a network, comprising:
   downloading a first file on the network from a server to a client;
   accessing time data from within the first file; and
   setting an accessing time to access a second file on said server based on said time data from the first file, wherein said time data includes an actual time when said second file is scheduled to be updated.

2. The method of claim 1, wherein the second file is an updated version of the first file.

3. The method of claim 1, further comprising selecting a second file to download based on said time data downloaded from the first file.

4. The method of claim 1, wherein said time data comprises a channel definition format file (CDF) that resides on said server.

5. The method of claim 1, wherein said setting an accessing time comprises:
   analyzing the time data from the first file to estimate when a second file is scheduled to be updated; and
   assigning the accessing time based on said estimate of when the second file is scheduled to be updated.

6. The method of claim 3, wherein said setting an accessing time comprises:
   analyzing the time data from the first file to estimate when a second file is scheduled to be updated; and
   assigning the accessing time based on said estimate of when the second file is scheduled to be updated.

7. A method for searching files on a network, comprising:
   accessing a server on the network from a client;
   downloading a first file from said server to said client;
   accessing time data from within said first file; and
   setting an accessing time to re-access the server based on said time data from the first file, wherein said time data includes an actual time when a second file is scheduled to be updated.

8. The method of claim 7, further comprising:
   accessing the server based upon the accessing time; and
   downloading a second file from the server.

9. The method of claim 8, wherein the second file is an updated version of the first file.

10. The method of claim 7, further comprising selecting said second file to download based on said time data downloaded from the first file.

11. The method of claim 8, further comprising selecting said second file to download based on said time data downloaded from the first file.

12. The method of claim 7, wherein said data comprises a channel definition format file (CDF) that resides on said server.

13. The method of claim 7, wherein said setting an accessing time comprises:
   analyzing the time data from the first file to estimate when a second file is scheduled to be updated; and
   assigning the accessing time based on said estimate of when the second file is scheduled to be updated.

14. The method of claim 13, wherein the accessing time is after the scheduled update of the second file.

15. The method of claim 8, wherein said setting an accessing time comprises:
   analyzing the time data from the first file to estimate when a second file is scheduled to be updated; and
   assigning the accessing time based on said estimate of when the second file is scheduled to be updated.

16. The method of claim 10, wherein setting an accessing time comprises:
   analyzing the time data from the first file to estimate when a second file is scheduled to be updated; and
   assigning the accessing time based on said estimate of when the second file is scheduled to be updated.

17. A system comprising a machine readable recording medium storing a program for searching through files stored on a network, said program including executable instructions for:
   downloading a first file on the network from a server to a client; and
   accessing time data from within the first file; and
   setting an accessing time to access a second file on said server based on said time data from the first file, wherein said time data includes an actual time when said second file is scheduled to be updated.

18. The system of claim 17, wherein the second file is an updated version of the first file.

19. The system of claim 17, further comprising selecting said second file to access based on said time data downloaded from the first file.

20. The system of claim 17, wherein said time data comprises a channel definition format file (CDF) that resides on said server.

21. The system of claim 17, wherein setting an accessing time comprises:
   analyzing the time data from the first file to estimate when a second file is scheduled to be updated; and
   assigning the accessing time based on said estimate of when the second file is scheduled to be updated.

22. The system of claim 19, wherein setting an accessing time comprises:
   analyzing the time data from the first file to estimate when said second file is scheduled to be updated; and
   assigning the accessing time based on said estimate of when the second file is scheduled to be updated.

23. A system for searching files stored on a network, comprising:
   means for downloading a first file on the network from a server to a client;
   means for accessing time data from within the first file; and
   means for setting an accessing time to access a second file on said server based on said time data from the first file, wherein said time data includes an actual time when said second file is scheduled to be updated.

* * * * *